US010816454B2

(12) United States Patent
Herve et al.

(10) Patent No.: US 10,816,454 B2
(45) Date of Patent: Oct. 27, 2020

(54) METHOD FOR OBSERVING A SAMPLE, BY CALCULATION OF A COMPLEX IMAGE

(71) Applicant: COMMISSARIAT A L'ENERGIE ATOMIQUE ET AUX ENERGIES ALTERNATIVES, Paris (FR)

(72) Inventors: Lionel Herve, Corenc (FR); Cedric Allier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 110 days.

(21) Appl. No.: 16/086,969

(22) PCT Filed: Mar. 22, 2017

(86) PCT No.: PCT/FR2017/050671
§ 371 (c)(1),
(2) Date: Sep. 20, 2018

(87) PCT Pub. No.: WO2017/162985
PCT Pub. Date: Sep. 28, 2017

(65) Prior Publication Data
US 2019/0101484 A1    Apr. 4, 2019

(30) Foreign Application Priority Data

Mar. 23, 2016 (FR) ..................... 16 52500

(51) Int. Cl.
*G01N 15/14*    (2006.01)
*G03H 1/04*    (2006.01)
(Continued)

(52) U.S. Cl.
CPC ..... *G01N 15/1434* (2013.01); *G01N 15/1429* (2013.01); *G01N 15/1475* (2013.01);
(Continued)

(58) Field of Classification Search
CPC .......... G01N 15/1429; G01N 15/1434; G01N 15/1475; G01N 2015/1006;
(Continued)

(56) References Cited

U.S. PATENT DOCUMENTS

2009/0290156 A1* 11/2009 Popescu ............. G01N 15/1434
356/338
2013/0260396 A1* 10/2013 Akcakir ............. G01N 15/0211
435/7.25
(Continued)

FOREIGN PATENT DOCUMENTS

WO   WO 2016/151248 A1   9/2016

OTHER PUBLICATIONS

International Search Report dated Jun. 20, 2017, in PCT/FR2017/050671, filed Mar. 22, 2017.
(Continued)

*Primary Examiner* — Michael A Lyons
(74) *Attorney, Agent, or Firm* — Oblon, McClelland, Maier & Neustadt, L.L.P.

(57) ABSTRACT

The invention relates to a method for observing a sample (15), comprising the illumination of the sample using a light source (11) and the acquisition of an image (Io) of the sample using an image sensor (16), the sample being disposed between the image sensor and the light source. Iterative steps are applied to the acquired image (Io), also referred to as a hologram, comprising: a single iterative numerical propagation (h), such as to estimate a complex image (A) of the sample in a reconstruction plane (P10) or in a detection plane (P0), in which the image sensor extends. The complex image can be used for the characterisation of the sample.

14 Claims, 5 Drawing Sheets

(51) Int. Cl.
*G03H 1/08* (2006.01)
*G01N 15/10* (2006.01)

(52) U.S. Cl.
CPC ......... *G03H 1/0443* (2013.01); *G03H 1/0866* (2013.01); *G01N 2015/1006* (2013.01); *G01N 2015/144* (2013.01); *G01N 2015/1454* (2013.01); *G03H 2001/045* (2013.01); *G03H 2001/0447* (2013.01); *G03H 2001/0452* (2013.01); *G03H 2001/0454* (2013.01); *G03H 2001/0816* (2013.01)

(58) Field of Classification Search
CPC ..... G01N 2015/144; G01N 2015/1454; G03H 1/0443; G03H 1/0866; G03H 2001/0447; G03H 2001/0452; G03H 2001/0816
See application file for complete search history.

(56) References Cited

U.S. PATENT DOCUMENTS

| | | | |
|---|---|---|---|
| 2014/0133702 A1* | 5/2014 | Zheng | G06K 9/00624 |
| | | | 382/103 |
| 2017/0045439 A1* | 2/2017 | Allier | G01N 15/1475 |
| 2018/0210395 A1* | 7/2018 | Allier | G03H 1/2645 |
| 2019/0101482 A1* | 4/2019 | Allier | G01N 15/0205 |

OTHER PUBLICATIONS

Denis, L., "Numerical suppression of the twin image in in-line holography of a volume of micro-objects", Measurement Science and Technology, vol. 19, No. 7, XP 020136298, Jul. 1, 2008, pp. 1-10.

Koren, G. et al., "Twin-image elimination in in-line holography of finite-support complex objects", Optics Letters, vol. 16, No. 24, XP 000244017, Dec. 15, 1991, pp. 1979-1981.

Hattay, J. et al., "Digital in-line particle holography: twin-image suppression using sparse blind source separation", Signal, Image and Video Processing, vol. 9, No. 8, XP 035537055, May 25, 2014, pp. 1767-1774.

* cited by examiner

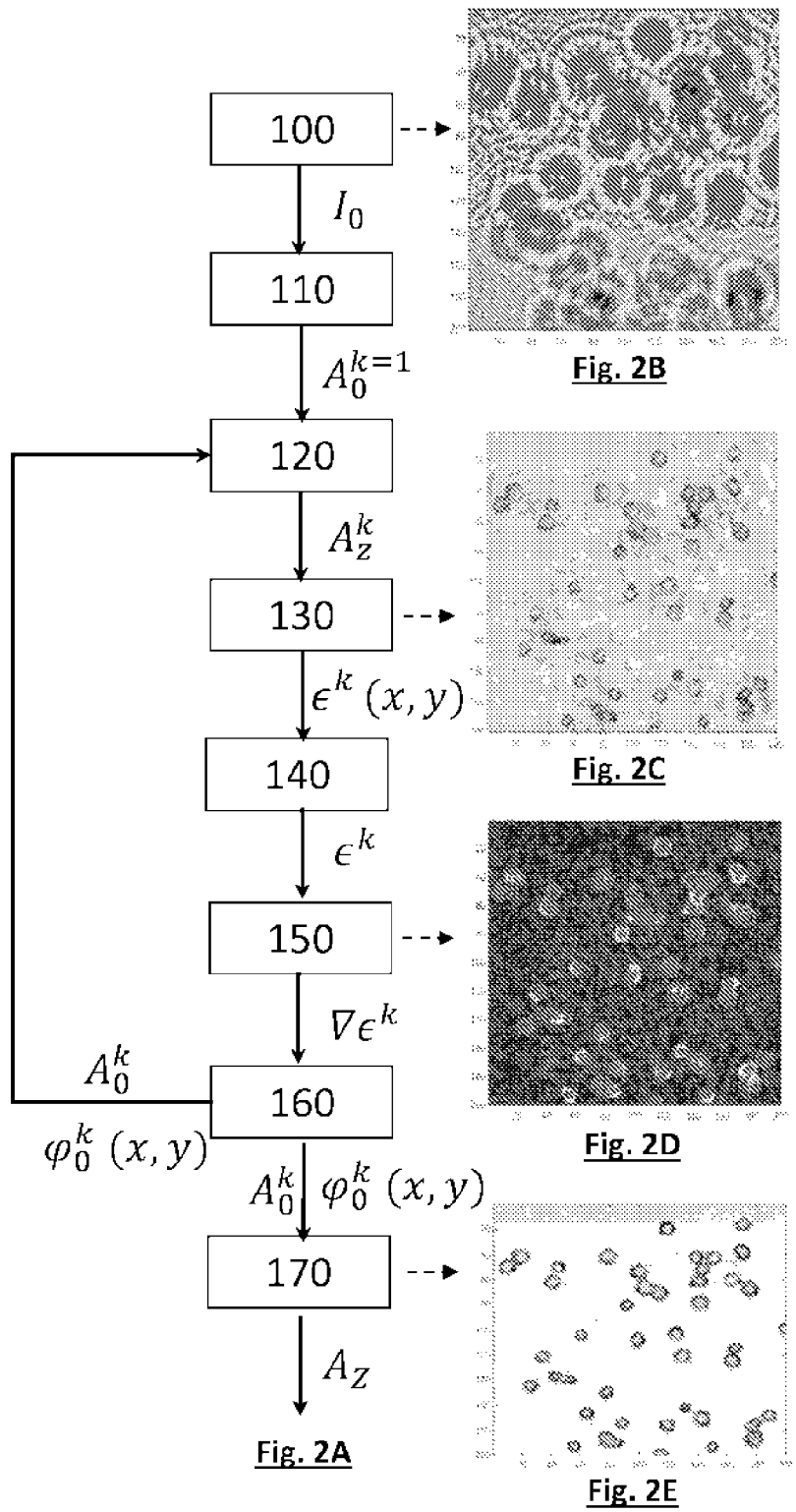

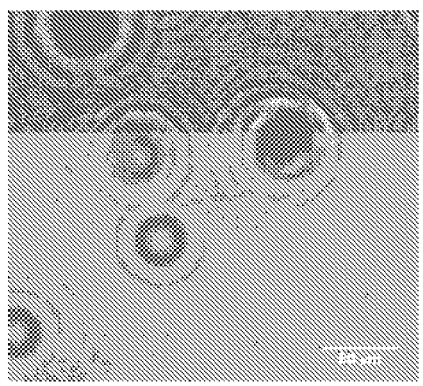
Fig. 5A
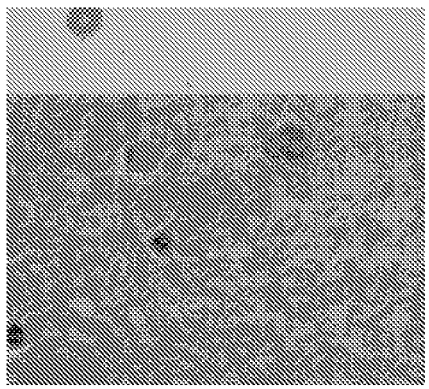 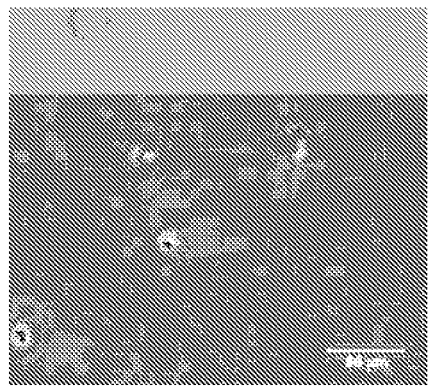
Fig. 5B                              Fig. 5C

METHOD FOR OBSERVING A SAMPLE, BY CALCULATION OF A COMPLEX IMAGE

TECHNICAL FIELD

The technical field of the invention is related to the observation of a sample, in particular a biological sample, by lens-free imaging.

PRIOR ART

The observation of samples, and in particular biological samples, by lens-free imaging has seen substantial development over the last ten years. This technique allows a sample to be observed by placing it between a light source and an image sensor, without placing a magnifying optical lens between the sample and the image sensor. Thus, the image sensor collects an image of the light wave transmitted by the sample.

This image is made up of interference patterns formed by interference between the light wave emitted by the light source and transmitted by the sample, and diffracted waves resulting from the diffraction by the sample of the light wave emitted by the light source. These interference patterns are sometimes called diffraction patterns.

Document WO2008090330 describes a device allowing biological samples, in this case cells, to be observed by lens-free imaging. The device allows an interference pattern to be associated with each cell and the morphology of this pattern allows the type of cell to be identified. Lens-free imaging would thus appear to be a simple and inexpensive alternative to a conventional microscope. In addition, its field of observation is clearly larger than that obtainable with a microscope. Thus, it will be understood that this technology has many potential applications.

Generally, the image formed on the image sensor, i.e. the image containing the interference patterns, may be processed by a holographic reconstruction algorithm, so as to estimate optical properties of the sample, for example a transmission factor or a phase. Such algorithms are well known in the field of holographic reconstruction. To estimate the optical properties of the sample, the distance between the sample and the image sensor being known, a propagation algorithm, taking into account this distance and the wavelength of the light wave emitted by the light source, is applied. It is then possible to reconstruct an image of an optical property of the sample. The reconstructed image may, in particular, be a complex image of the light wave transmitted by the sample, containing information on the phase-variation or absorption optical properties of the sample. However, these holographic reconstruction algorithms may induce reconstruction noise in the reconstructed image, this noise being referred to as "twin images". It is essentially due to the fact that the image formed on the image sensor does not contain information on the phase of the light wave reaching this sensor. Thus, the holographic reconstruction is carried out on the basis of partial optical information based solely on the intensity of the light wave collected by the image sensor.

The improvement of holographic reconstruction quality has been the subject of many improvements, implementing algorithms that are frequently called "phase retrieval" algorithms, allowing the phase of the light wave to which the image sensor is exposed to be estimated.

A numerical reconstruction algorithm is for example described in US2012/0218379.

The inventors propose a method for observing a sample using a holographic imaging technique, the method comprising a step of reconstructing a complex image of the sample. This reconstructing step allows a complex image of good quality, providing information on the optical properties of the sample, to be obtained.

SUMMARY OF THE INVENTION

One subject of the invention is a method for observing a sample comprising the following steps:
  a) exposing the sample to illumination using a light source, able to emit a light wave that propagates towards the sample;
  b) acquiring, using an image sensor, an image of the sample, said image being formed in a detection plane, the sample being placed between the light source and the image sensor, each image being representative of a light wave transmitted by the sample under the effect of said illumination; and
  c) calculating a complex image representative of the sample;
the method being characterized in that the calculation of said complex image comprises the following substeps:
  i) defining an initial image of the sample in the detection plane, on the basis of the image acquired by the image sensor;
  ii) determining a complex image of the sample in a reconstruction plane by applying a propagation operator to the initial image of the sample, i.e. to the image defined in substep i) or the image of the sample, in the detection plane, resulting from the preceding iteration;
  iii) calculating a noise indicator on the basis of the complex image determined in substep ii), this noise indicator depending, preferably via an increasing or decreasing function, on a reconstruction noise affecting said complex image;
  iv) updating the image of the sample in the detection plane by adjusting phase values of the pixels of said image, the adjustment being carried out depending on a variation in the indicator calculated in substep iii) depending on said phase values;
  v) reiterating substeps ii) to iv) until a convergence criterion is reached, so as to obtain a reference complex image of the sample in the detection plane, or in the reconstruction plane.

According to one embodiment, substep iii), comprises:
  for various pixels, calculating a quantity associated with each pixel, depending on the value of the complex image determined in substep ii) for said pixel, or on a dimensional derivative of said complex image for said pixel; and
  combining the quantities calculated for different pixels, so as to obtain the noise indicator.

The norm calculated for each pixel is preferably a norm of order lower than or equal to 1. It may be obtained from a dimensional derivative of the complex image, this derivative being calculated for a plurality of pixels of the image, or even for each pixel of the image. It may also be obtained from the value of the complex image in a plurality of pixels of the image, or even in each pixel of the image.

The noise indicator quantifies the reconstruction noise affecting the reconstructed complex image. It may be a question of a norm of order lower than or equal to 1 calculated on the basis of the quantities associated with each pixel.

The quantity associated with each pixel may be calculated on the basis of the modulus of a dimensional derivative, for said pixel, of the complex image determined in substep ii).

It may be obtained from a dimensional derivative of the complex image, this derivative being calculated for a plurality of pixels of the image, or even for each pixel of the image. It may also be obtained from the value of the complex image in a plurality of pixels of the image, or even in each pixel of the image.

According to one embodiment, in substep i), the initial image of the sample is defined by normalizing the image acquired by the image sensor by an image representative of the light wave emitted by the light source;

in substep iii), the quantity associated with each pixel is calculated depending on the value of the complex image determined in substep ii), for said pixel, subtracted from a strictly positive number, in particular the number 1.

The method may comprise one of the following features, implemented alone or in combination:

in substep iii), the indicator is a sum, which is optionally weighted, of the quantity associated with each pixel of the complex image determined in substep ii);

in substep iv), the value of the phase of each pixel is adjusted by forming a vector, called the phase vector, each term of which corresponds to the value of the phase of a pixel of the image of the sample in the detection plane, this vector being updated, in each iteration, so as to minimize, or to maximize, the noise indicator calculated in substep iii), this operation being based on a gradient of the noise indicator depending on each term of said phase vector. The phase vector may be updated by a minimization or maximization algorithm based on a gradient of the noise indicator, depending on each term of said phase vector.

The reconstruction plane may preferably lie parallel or substantially parallel to the detection plane. Preferably, the reconstruction plane is a plane in which the sample lies.

According to one embodiment, no magnifying optic is interposed between the sample and the image sensor.

The method may comprise a step d) of characterizing the sample depending on the calculated complex image.

The sample may in particular contain particles suspended in a continuous medium. By characterization, what is for example meant is:

a determination of the nature of a particle, i.e. a classification of this particle among one or more preset classes;

a determination of the state of a particle, among one or more preset states;

an estimation of the size of a particle, or of its shape, or of its volume or any other geometrical parameter;

an estimation of an optical property of one or more particles, for example the refractive index or an optical-transmission property;

a count of said particles.

Other advantages and features will become more clearly apparent from the following description of particular embodiments of the invention, which embodiments are given by way of nonlimiting example, and shown in the drawings listed below.

FIGURES

FIG. 2A illustrates the main steps of a method allowing a complex image of the sample in a reconstruction plane to be calculated.

FIGS. 2B, 2C, 2D and 2E respectively show:

a hologram acquired by the image sensor;

an image reconstructed in a reconstruction plane in a first iteration of the method shown in FIG. 2A;

an image showing a quantity associated with each pixel of the image shown in FIG. 20, and a representation of a reconstructed image after a plurality of iterations of the method shown in FIG. 2A.

Figure 3A:
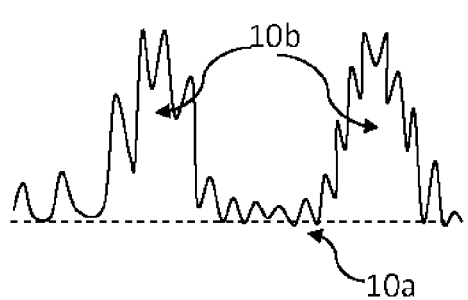
Figure 3B:
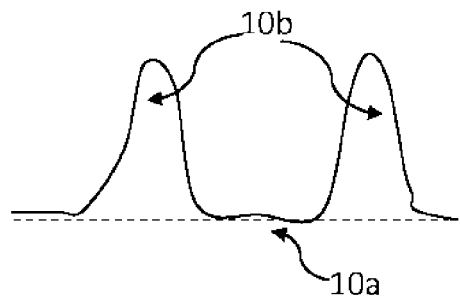

FIGS. 3A and 3B schematically show a profile of the modulus or of the phase of a complex image obtained by holographic reconstruction, in the presence of and without reconstruction noise, respectively.

Figure 4:
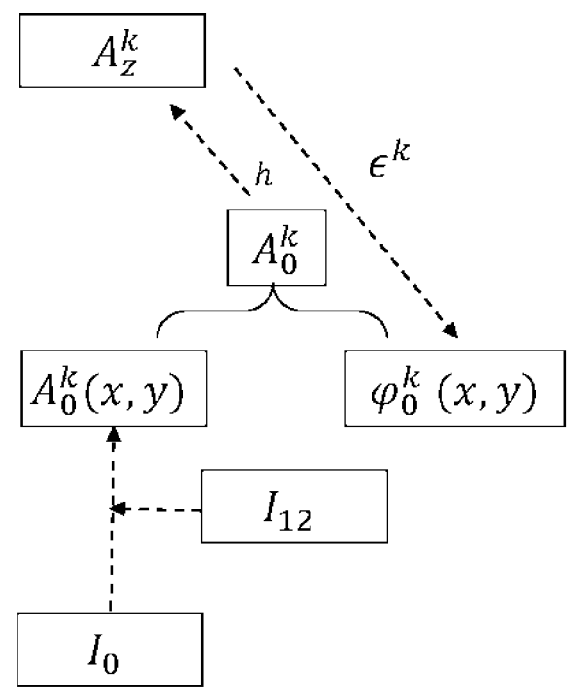

FIG. 4 summarizes the operation of a method implementing the invention.

FIG. 5A is a hologram acquired by an image sensor, the sample comprising cells dispersed in a continuous aqueous phase. FIGS. 5B and 5C show the modulus and the phase of a complex image in the plane of the sample, this complex image being formed by implementing the invention, respectively.

Figure 6A:
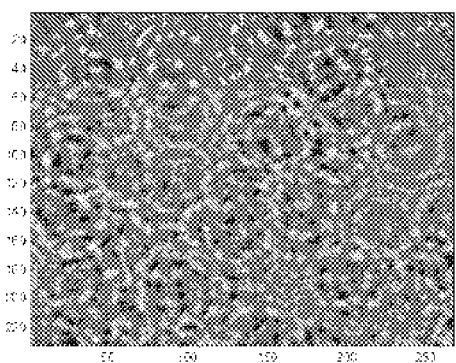
Figure 6B:
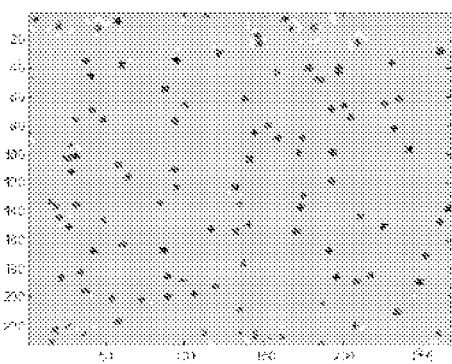
Figure 6C:
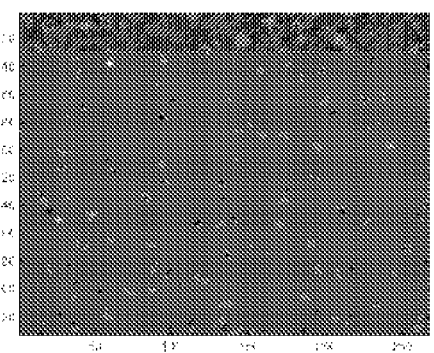

FIG. 6A is a hologram acquired by an image sensor, the sample containing red blood cells dispersed in a continuous aqueous phase; and FIGS. 6B and 6C show the modulus and the phase of a complex image in the plane of the sample, this complex image being formed by implementing the invention, respectively.

DESCRIPTION OF PARTICULAR EMBODIMENTS

Figure 1:
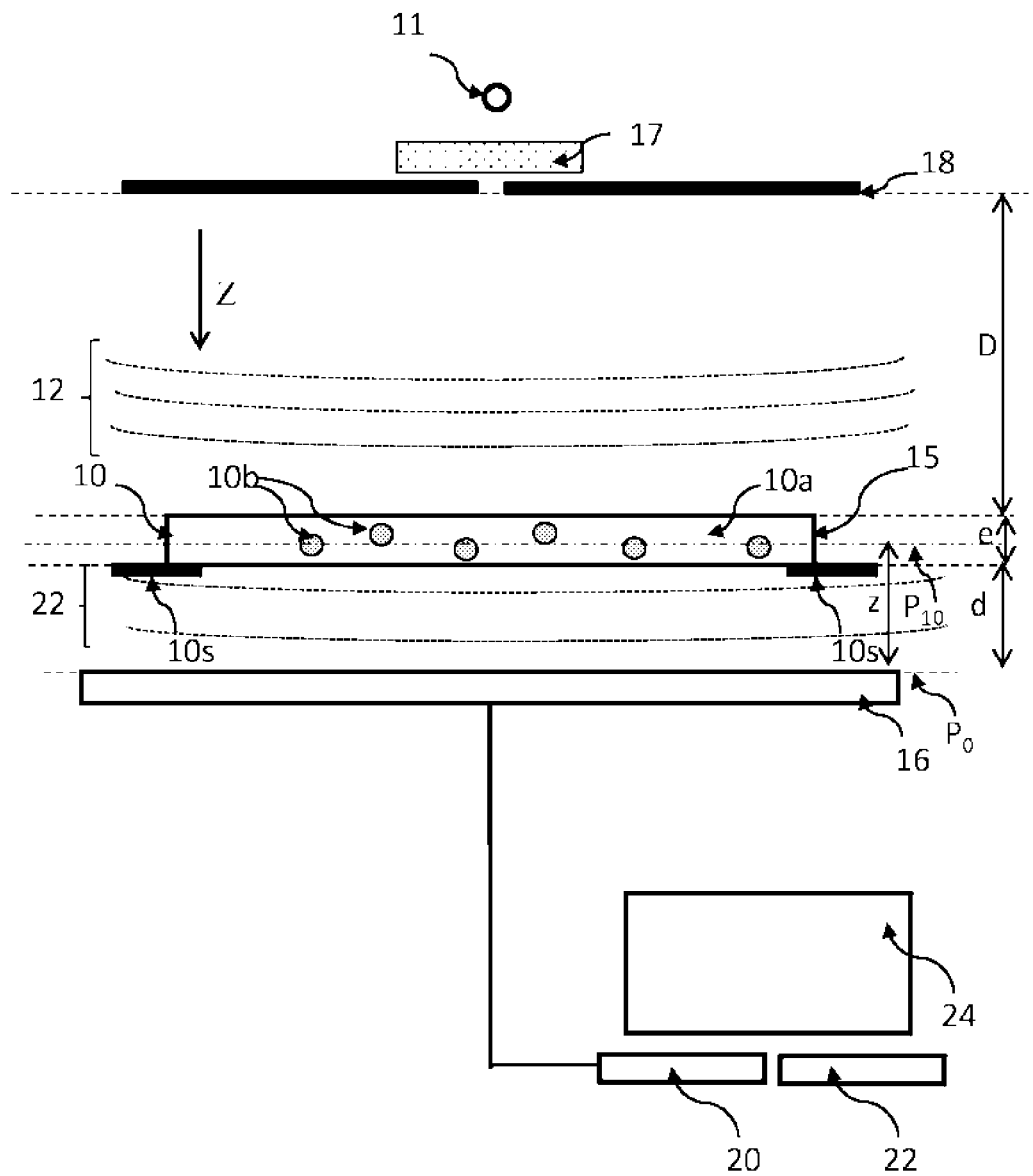
FIG. 1 shows an example of a device according to the invention.

FIG. 1 shows an example of a device according to the invention. A light source 11 is able to emit a light wave 12, called the incident light wave, that propagates in the direction of a sample 10, along a propagation axis Z. The light wave is emitted in a spectral band $\Delta\lambda$ including a wavelength $\lambda$. This wavelength may be a central wavelength of said spectral band.

The sample 10 is a sample that it is desired to characterize. It may in particular be a question of a medium 10a containing particles 10b. The particles 10b may be blood particles, for example red blood cells. It may also be a question of cells, microorganisms, for example bacteria or yeasts, microalgae, microbeads, or droplets that are insoluble in the liquid medium, for example lipid nanoparticles. Preferably, the particles 10b have a diameter, or are inscribed in a diameter, smaller than 1 mm, and preferably smaller than 100 µm. It is a question of microparticles (diameter smaller than 1 mm) or of nanoparticles (diameter smaller than one micron). The medium 10a, in which the particles are immersed, may be a liquid medium, for example a liquid phase of a bodily liquid, a culture medium or a liquid sampled from the environment or from an industrial process. It may also be a question of a solid medium or a medium having the consistency of a gel, for example an agar substrate, propitious to the growth of bacterial colonies.

The sample 10 is contained in a fluidic chamber 15. The fluidic chamber 15 is for example a microcuvette, commonly used in point-of-care type devices, into which fluidic chamber 15 the sample 20 penetrates, for example via capillary action. The thickness e of the sample 10, along the propagation axis, typically varies between 20 µm and 1 cm, and is preferably comprised between 50 µm and 500 µm, and is for example 150 µm.

The sample lies in a plane $P_{10}$, called the sample plane, that is perpendicular to the propagation axis. It is held on a holder 10s.

The distance D between the light source 11 and the sample 10 is preferably larger than 1 cm. It is preferably comprised between 2 and 30 cm. Preferably, the light source, seen by the sample, may be considered to be point-like. This means that its diameter (or its diagonal) is preferably smaller than one tenth, and better still one hundredth, of the distance between the sample and the light source. Thus, preferably, the light reaches the sample in the form of plane waves, or waves that may be considered as such.

The light source 11 may be a light-emitting diode or a laser diode. It may be associated with a diaphragm 18, or spatial filter. The aperture of the diaphragm is typically comprised between 5 μm and 1 mm, and preferably between 50 μm and 500 μm. In this example, the diaphragm is supplied by Thorlabs under the reference P150S and its diameter is 150 μm. The diaphragm may be replaced by an optical fiber, a first end of which is placed facing the light source 11 and a second end of which is placed facing the sample 10.

The device preferably includes a diffuser 17, placed between the light source 11 and the diaphragm 18. Use of such a diffuser allows constraints on the centering of the light source 11 with respect to the aperture of the diaphragm 18 to be relaxed. The function of such a diffuser is to spread the light beam, produced by an elementary light source $11_i$, ($1 \leq i \leq 3$) over a cone of angle α, a being equal to 30° in the present case. Preferably, the diffusion angle α varies between 10° and 80°.

Preferably, the spectral emission band Δλ of the incident light wave 12 has a width smaller than 100 nm. By spectral bandwidth, what is meant is a full width at half maximum of said spectral band.

The sample 10 is placed between the light source 11 and an image sensor 16. The latter preferably lies parallel, or substantially parallel, to the plane in which the sample lies. The expression "substantially parallel" means that the two elements may not be rigorously parallel, an angular tolerance of a few degrees, smaller than 20° or 10° being acceptable.

The image sensor 16 is able to form an image, in a detection plane $P_0$. In the example shown, it is a question of an image sensor comprising a matrix array of pixels, of CCD or CMOS type. CMOS sensors are the preferred type of sensor because the pixels are smaller in size, this allowing images the spatial resolution of which is more favorable to be acquired. The detection plane $P_0$ preferably lies perpendicular to the propagation axis Z of the incident light wave 12.

The distance d between the sample 10 and the matrix array of pixels of the image sensor 16 is preferably comprised between 50 μm and 2 cm, and preferably comprised between 100 μm and 2 mm.

The absence of magnifying optics between the image sensor 16 and the sample 10 will be noted. This does not prevent focusing micro-lenses optionally being present near each pixel of the image sensor 16, the latter not having the function of magnifying the image acquired by the image sensor.

Under the effect of the incident light wave 12, the sample 10 may generate a diffracted wave, that is liable to produce, in the detection plane $P_0$, interference, in particular with a portion of the incident light wave 12 that is transmitted by the sample. Moreover, the sample may absorb a portion of the incident light wave 12. Thus, the light wave 22, transmitted by the sample, and to which the image sensor 20 is exposed, may comprise:
- a component resulting from the diffraction of the incident light wave 12 by the sample;
- a component resulting from the absorption of the incident light wave 12 by the sample.

The light wave 22 could also be called the "exposure light wave". A processor 20, for example a microprocessor, is able to process each image acquired by the image sensor 16. In particular, the processor is a microprocessor connected to a programmable memory 22 in which a sequence of instructions to carry out the image-processing operations and calculations described in this description is stored. The processor may be coupled to a screen 24 allowing the display of images acquired by the image sensor 16 or calculated by the processor 20.

An image acquired on the image sensor 16, which image is also called a hologram, does not allow a sufficiently precise representation of the observed sample to be obtained. As described with reference to the prior art, it is possible to apply, to each image acquired by the image sensor, a propagation operator h, so as to calculate a quantity representative of the light wave 22 transmitted by the sample 10, and to which the image sensor 16 is exposed. Such a method, which is referred to as a "holographic reconstruction" method, in particular allows an image of the modulus or of the phase of this light wave 22, in a reconstruction plane parallel to the detection plane $P_0$, and in particular in the plane $P_{10}$ in which the sample lies, to be reconstructed. To do this, the image $I_0$ acquired by the image sensor 16 and a propagation operator h are convoluted. It is then possible to reconstruct a complex expression A for the light wave 22 at every point of spatial coordinates (x,y,z), and in particular in a reconstruction plane $P_z$ located at a distance |z| from the image sensor 16, this reconstruction plane possibly being the plane $P_{10}$ of the sample. The complex expression A is a complex quantity the argument and the modulus of which are representative of the phase and of the intensity of the light wave 22 to which the image sensor 16 is exposed, respectively. Convoluting the image $I_0$ and the propagation operator h allows a complex image $A_z$ representing a spatial distribution of the complex expression A in a plane $P_z$, called the reconstruction plane lying at a coordinate z from the detection plane $P_0$, to be obtained. In this example, the equation of the detection plane $P_0$ is z=0. This complex image corresponds to a complex image of the sample in the reconstruction plane $P_z$. It also represents a two-dimensional spatial distribution of the optical properties of the wave 22 to which the image sensor 16 is exposed.

The function of the propagation operator h is to describe the propagation of light between the image sensor 16 and a point of coordinates (x,y,z), located at a distance |z| from the latter. It is then possible to determine the modulus M(x,y,z) and/or the phase φ (x,y,z) of the light wave 22, at this distance |z|, which is called the reconstruction distance, with:

$$M(x,y,z) = \text{abs}[A(x,y,z)] \quad (1)$$

$$\varphi(x,y,z) = \arg[A(x,y,z)] \quad (2)$$

The operators abs and arg are the modulus and argument, respectively.

In other words, the complex amplitude A of the light wave 22 at every point of spatial coordinates (x,y,z) is such that:
$A(x,y,z) = M(x,y,z)e^{j\varphi(x,y,z)}$ (3).

However, such a reconstruction is accompanied by reconstruction noise that may be substantial, because the propagation is carried out on the basis of an image $I_0$ containing no phase information.

An algorithm allowing a complex image, denoted $A_z$, representing a spatial distribution of the complex amplitude $A(x,y,z)$ at a distance $|z|$, to be obtained will now be described with reference to FIG. 2A, the images obtained in certain steps being illustrated in FIGS. 2B to 2E. Such an image is representative of the light wave 22, to which the image sensor 16 is exposed, and in particular allows the modulus or the phase of this light wave to be accessed.

Step 100: Image Acquisition:

In this step, the image sensor 16 acquires an image $I_0$ of the sample 16, and more precisely of the light wave 22 transmitted by the latter, to which the image sensor is exposed. Such an image, or hologram, is shown in FIG. 2B.

This image was produced using a sample 10 containing Chinese hamster ovary (CHO) cells submerged in a saline buffer, the sample being contained in a fluidic chamber of 100 μm thickness placed as a distance d of 1500 μm from a CMOS sensor. The sample was illuminated with a light-emitting diode 11 the spectral emission band of which is centered on a wavelength of 450 nm and located at a distance D=8 cm from the sample.

Step 110: Initialization:

In this step, an initial image $A_0^{k=0}$ of the sample is defined on the basis of the image $I_0$ acquired by the image sensor 16. This step is an initialisation of the iterative algorithm described below with reference to the steps 120 to 180, the exponent k giving the rank of each iteration. The modulus $M_0^{k=0}$ of the initial image $A_0^{k=0}$ may be obtained by applying the square-root operator to the image $I_0$ acquired by the image sensor, in which case $M_0^{k=0} = \sqrt{I_0}$. It may also be obtained by normalising the image $I_0$ with a term representative of the intensity of the light wave 12 incident on the sample 16. The latter may be:

the square root of an average $\overline{I_0}$ of the image $I_0$, in which case each pixel $I_0(x,y)$ of the acquired image is divided by said average, such that $$M_0^{k=0} = \sqrt{\frac{I_0(x, y)}{\overline{I_0}}} \quad (4)$$

an image $I_{12}$ without sample, acquired by the image sensor 16 in the absence of sample between the light source 11 and the image sensor, in which case the value $I_0(x,y)$ of each pixel of the acquired image of the sample is divided by the value $I_{12}(x,y)$ of each pixel of the image without sample:

$$M_0^{k=0} = \sqrt{\frac{I_0(x, y)}{I_{12}(x, y)}}$$

(4')

an average $\overline{I_{12}}$ of said image without sample, in which case each pixel $I_0(x,y)$ of the acquired image is divided by said average:

$$M_0^{k=0} = \sqrt{\frac{I_0(x, y)}{\overline{I_{12}}}} \quad (4'')$$

The phase $\varphi_0^{k=0}$ of the initial image $A_0^{k=0}$ is either considered to be zero for each pixel (x,y), or preset to an arbitrary value. Specifically, the initial image $Ar_0^{k=0}$ results directly from the image $I_0$ acquired by the image sensor 16. However, the latter image contains no information on the phase of the light wave 22 transmitted by the sample 10 the image sensor 16 being sensitive only to the intensity of this light wave.

Step 120: Propagation:

In this step, the image $A_0^{k-1}$ obtained in the plane of the sample is propagated to a reconstruction plane $P_z$, by applying a propagation operator such as described above, so as to obtain a complex image $A_z^k$, which is representative of the sample, in the reconstruction plane $P_z$. The wording "complex image" expresses the fact that each term of this image is a complex quantity. The propagation is achieved by convoluting the image $A_z^{k-1}$ with the propagation operator $h_{-z}$, such that:

$$A_k^z = A_0^{k-1} * h_{-z}, \quad (5),$$

the symbol * representing a convolution. The index –z represents the fact that the propagation is carried out in a direction opposite to the propagation axis Z. Back propagation is spoken of.

The propagation operator is for example the Fresnel-Helmholtz function, such that:

$$h(x, y, z) = \frac{1}{j\lambda z} e^{j2\pi \frac{z}{\lambda}} \exp\left(j\pi \frac{x^2 + y^2}{\lambda z}\right) \quad (6)$$

The convolution is generally carried out in the frequency domain, in which it equates to a product, in which case the Fourier transform of this operator is used, the latter being:

$$H(\mu, \nu, z) = e^{j2\pi \frac{z}{\lambda}} \exp(-\lambda z(\mu^2 + \nu^2)) \quad (6')$$

where λ is the central wavelength of the spectral emission band of the light source 11.

Thus, $$A_z^k(x, y) = A_z^k(r) = -\frac{1}{j\lambda z} e^{-j2\pi \frac{z}{\lambda}} \int\int A_0^{k-1}(r') \exp-\left(j\pi \frac{(r-r')^2}{\lambda z}\right) dr' \quad (7)$$

where r and r' are radial coordinates, i.e. in the reconstruction plane $P_z$ and in the detection plane $P_0$, respectively.

In the first iteration (k=1), $A_0^{k=0}$ is the initial image determined in step 110. In following iterations, $A_0^{k-1}$, is the complex image updated in the preceding iteration, in the detection plane $P_0$.

The reconstruction plane $P_z$ is a plane that is distant from the detection plane $P_0$, and preferably parallel to the latter. Preferably, the reconstruction plane $P_z$ is a plane $P_{10}$ in which the sample 10 lies. Specifically, an image reconstructed in this plane allows a generally high spatial resolution to be obtained. It may also be a question of another plane, located at a nonzero distance from the detection plane, and preferably parallel to the latter, for example a plane lying between the image sensor 16 and the sample 10.

FIG. 2C shows the modulus of an image $A_z^{k-1}$, reconstructed at a distance of 1440 μm from the detection plane $P_0$ by applying the propagation operator defined above to the hologram of FIG. 2B. This image shows the complex image, in the reconstruction plane, established in the first iteration.

Step 130: Calculating a Quantity for a Plurality of Pixels of the Complex Image:

In this step, a quantity $\in^k(x,y)$ associated with each pixel of a plurality of pixels (x,y) of the complex image $A_z^k$, and preferably with each of these pixels, is calculated. This quantity depends on the value $A_z^k(x,y)$ of the image $A_z^k$, or on its modulus, in the pixel (x,y) for which it is calculated. It may also depend on a dimensional derivative of the image in this pixel, for example the modulus of a dimensional derivative of this image.

In this example, the quantity $\in^k(x,y)$ associated with each pixel (x,y) is based on the modulus of a dimensional derivative, such that:

$$\varepsilon^k(x, y) = \sqrt{\left|\frac{\partial A_z^k(x, y)}{\partial x}\right|^2 + \left|\frac{\partial A_z^k(x, y)}{\partial y}\right|^2} \quad (8)$$

Since the image is discretized into pixels, the derivative operators may be replaced by Sobel operators, such that:

$$\varepsilon^k(x, y) = \qquad (9)$$
$$\sqrt{(S_x * A_z^k(x, y))(S_x * A_z^k(x, y))^* + (S_y * A_z^k(x, y))(S_y * A_z^k(x, y))^*}$$

where:
( )* represents the complex-conjugate operator; and
$S_x$ and $S_y$ are Sobel operators along two orthogonal axes X and Y of the reconstruction plane $P_z$.

In this example, $$S_x = \begin{bmatrix} 1 & 0 & -1 \\ 2 & 0 & -2 \\ 1 & 0 & -1 \end{bmatrix} \quad (10)$$

and $S_y$ is the transpose matrix of $S_x$.

FIG. 2D shows, in the form of an image, the value of the quantity $\varepsilon^k(x,y)$ in each pixel of the image $A_z^{k=1}$ shown in FIG. 2C.

Step 140: establishing a noise indicator associated with the image $A_z^k$:

In step 130, quantities $\varepsilon^k(x,y)$ are calculated for a plurality of pixels of the complex image $A_z^k$. These quantities may form a vector $E^k$, the terms of which are the quantities $\varepsilon^k(x,y)$ associated with each pixel (x,y).

In this step, an indicator, called the noise indicator, is calculated on the basis of a norm of the vector $E^k$. Generally, an order is associated with a norm, such that the norm $\|x\|_p$ of order p of a vector x of dimension n of coordinates $(x_1, x_2, \ldots x_n)$ is such that:

$$\|x\|_p = (\Sigma_{i=1}^n |x_i x_i|^p)^{1/p}, \text{ with } p \geq 0. \quad (12)$$

In the present case, a norm of order 1, is used, in other words p=1. Specifically, the inventors have come to the conclusion that use of a norm of order 1 or of order lower than or equal to 1, is particularly suited to this algorithm, for the reasons explained below with reference to FIGS. 3A and 3B.

In this step, the quantity $\varepsilon^k(x,y)$ calculated on the basis of the complex image $A_z^k$ for each pixel (x,y) of the latter, is summed so as to form a noise indicator $\varepsilon^k$ associated with the complex image $A_z^k$.

Thus, $\varepsilon^k = \Sigma_{(x,y)} \varepsilon^k(x,y)$ (15).

This noise indicator $\varepsilon^k$ corresponds to a total variation norm of the complex image $A_z^k$.

With reference to the image in FIG. 2D, the noise indicator $\varepsilon^{k=1}$ is obtained, in the first iteration, by summing the value of the pixels of this image.

Alternatively to a norm of order 1, a weighted sum of the quantities $\varepsilon^k(x,y)$, or another arithmetic combination, is also envisionable.

Because of the use of a norm of order 1, or of order lower than or equal to 1, the value of the noise indicator $\varepsilon^k$ decreases as the complex image $A_z^k$ becomes more representative of the sample. Specifically, in the first iterations, the value of the phase $\varphi_0^k(x,y)$, in the each pixel (x,y) of the image $A_0^k$, is poorly estimated. The propagation of the image of the sample from the detection plane $P_0$ to the reconstruction plane $P_z$ is thus accompanied by a substantial amount of reconstruction noise, as mentioned with reference to the prior art. This reconstruction noise takes the form of fluctuations that appear in the reconstructed image. Because of these fluctuations, a noise indicator $\varepsilon^k$, such as defined above, increases as the contribution of the reconstruction noise, to the reconstructed image, increases. Specifically, fluctuations due to the reconstruction noise tend to increase the value of this indicator.

FIGS. 3A and 3B schematically show a radial profile of the modulus (or of a phase) of a reconstructed image, that is affected by a large amount and a small amount of reconstruction noise, respectively. A sample containing a dispersion of particles 10b in a transparent homogenous medium 10a is considered here. The schematic profiles contain two large fluctuations, each of these fluctuations being representative of a particle 10b. The profile of FIG. 3A also includes high-frequency fluctuations of lower amplitude that are representative of reconstruction noise. The noise indicator $\varepsilon^k$, such as defined above, is higher for FIG. 3A than for FIG. 3B. An indicator $\varepsilon^k$ based on a norm of order higher than 1 could also be used, but such a norm tends to attenuate low-amplitude fluctuations, which are representative of reconstruction noise, with respect to large fluctuations, which are representative of the sample. In contrast, a norm of order 1, or of order lower than 1, does not attenuate small fluctuations with respect to large fluctuations. This is why the inventors prefer an indicator of reconstruction noise $\varepsilon^k$ based on a norm of order 1 or lower than 1.

An important aspect of this step consists in determining, in the detection plane $P_0$, for each pixel of the image $A_0^k$ of the sample, phase values $\varphi_0^k(x,y)$ allowing, in a following iteration, a reconstructed image $A_z^{k+1}$ to be obtained the indicator $\varepsilon^{k+1}$ of which is lower than the indicator $\varepsilon^k$.

In the first iteration, as explained above, relevant information is only available on the intensity of the light wave 22 and not on its phase. The first image $A_z^{k=1}$ reconstructed in the reconstruction plane $P_z$ is therefore affected by a substantial amount of reconstruction noise, because of the absence of relevant information as to the phase of the light wave 22 in the detection plane $P_0$. Therefore, the indicator $\varepsilon^{k=1}$ is high. In following iterations, the algorithm gradually adjusts the phase $\varphi_0^k(x,y)$ in the detection plane $P_0$, so as to gradually minimise the indicator $\varepsilon^k$.

The image $A_0^k$ in the detection plane is representative of the light wave 22 in the detection plane $P_0$, both from the point of view of its intensity and of its phase. The steps 120 to 160 aim to establish, iteratively, for each pixel of the image $A_0^k$, the value of the phase $\varphi_0^k(x,y)$ that minimizes the indicator $\varepsilon^k$, the latter being obtained $A_z^k$ from the image obtained by propagation of the image $A_0^{k-1}$ to the reconstruction plane $P_z$.

The minimization algorithm may be a gradient descent algorithm or a conjugated gradient descent algorithm, the latter being described below.

Step 150: Adjusting the Value of the Phase in the Detection Plane:

Step 150 aims to determine a value for the phase $\varphi_0^k(x,y)$ of each pixel of the complex image $A_0^k$ so as to minimise the indicator $\varepsilon^{k+1}$ resulting from a propagation of the complex image $A_0^k$ to the reconstruction plane $P_z$, in the following iteration k+1.

To do this, a phase vector $\varphi_0^k$ is established, each term of which is the phase $\varphi_0^k(x,y)$ of a pixel (x,y) of the complex image $A_0^k$. The dimension of this vector is ($N_{pix}$, 1), where $N_{pix}$ is the number of pixels in question. This vector is updated in each iteration, using the following updating expression:

$$\varphi_0^k(x,y)=\varphi_0^{k-1}(x,y)+\alpha^k p^k(x,y) \quad (16) \text{ where:}$$

$\alpha^k$ is a scalar, referred to as the "step size", and representing a distance;

$p^k$ is a direction vector, of dimension ($N_{pix}$, 1), each term p(x,y) of which forms a direction of the gradient $\nabla \varepsilon^k$ of the indicator $\varepsilon^k$.

This equation may be expressed in vector form, as follows:

$$\varphi_0^k=\varphi_0^{k-1}+\alpha^k p^k \quad (16')$$

It is possible to show that:

$$p^k=\nabla \varepsilon^k+\beta^k p^{k-1} \quad (17)$$

where:

$\nabla \varepsilon^k$ is a gradient vector, of dimension ($N_{pix}$, 1), each term of which represents a variation in the indicator $\varepsilon^k$ as a function of each of the degrees of freedom, forming the unknowns of the problem, i.e. the terms of the vector $\varphi_0^k$;

$p^{k-1}$ is a direction vector established in the preceding phase;

$\beta^k$ is a scale factor applied to the direction vector $p^{k-1}$.

Each term $\nabla \varepsilon^k(x,y)$ of the gradient vector $\nabla \varepsilon^k$, is such that $$\nabla \varepsilon^k(r') = \quad (18)$$
$$\frac{\partial \varepsilon^k}{\partial \varphi_0^k(r')} = -\text{Im}\left(A_0^{k*}(r')\left(\left(S_x * \frac{S_x * A_z^k}{\varepsilon^k} + S_y * \frac{S_y * A_z^k}{\varepsilon^k}\right) * h_z\right)(r')\right)$$

where Im is the imaginary-part operator and r' is a coordinate (x,y) in the detection plane.

The scale factor $\beta^k$ is a scalar, it may be expressed such that:

$$\beta^{(k)} = \frac{\nabla \varepsilon^{(k)} \cdot \nabla \varepsilon^{(k)}}{\nabla \varepsilon^{(k-1)} \cdot \nabla \varepsilon^{(k-1)}}, \quad (19)$$

the symbol . representing a scalar product.

The step size $\alpha^k$ may vary depending on the iteration, for example between 0.03 in the first iterations and 0.0005 in the last iterations.

The updating equation allows an adjustment of the vector $\varphi_0^k$ to be obtained, thereby leading to an iterative update of the phase $\varphi_0^k(x,y)$ of each pixel of the complex image $A_0^k$.

This complex image $A_0^k$, in the detection plane, is then updated with these new values of the phase associated with each pixel. It will be noted that the modulus of the complex image $A_0^k$ is not modified, the latter being determined on the basis of the image acquired by the image sensor, such that $M_0^k(x,y)=M_0^{k=0}(x,y)$.

Step 160: Reiteration or Termination of the Algorithm:

Provided that a convergence criterion has not been met, step 160 consists in reiterating the algorithm, with a new iteration of steps 120 to 160, on the basis of the complex image $A_0^k$ updated in step 150.

The convergent criterion may be a preset number K of iterations, or a minimum value of the gradient $\nabla \varepsilon^k$ of the indicator, or a difference considered to be negligible between two consecutive phase vectors $\varphi_0^{k-1}$, $\varphi_0^k$. When the convergence criterion has been met, an estimation that is considered to be correct of a complex image of the sample, in the detection plane $P_0$ or in the reconstruction plane 4, is considered to have been obtained.

The method may comprise an ultimate step 170 of reconstructing a complex image $A_z$ of the sample in the reconstruction plane $P_z$, by applying a propagation operator to the image $A_0^k$ of the sample in the detection plane obtained in the last iteration.

FIG. 2E shows an image of the modulus $M_z^{k=30}$ of each pixel of the reference complex image $A_z^{k=30}$ obtained in a reconstruction plane $P_z$ at the end of 30 iterations. This image may be compared to FIG. 2C, showing a similar image $A_z^{k=1}$ obtained in the first iteration. A clear decrease in reconstruction noise, in particular between each pixel, may be seen.

In the example that has been given, the quantity $\varepsilon^k(x,y)$, associated with each pixel, and implemented in step 130, is based on a dimensional derivative calculated for each pixel (x,y) of the image $A_z^k$. According to one variant, the initial image $A_0^{k=0}$ is normalised, as described above, by a scalar or an image representative of the incident wave 12. In this way, for each pixel, the modulus of the image of the sample, in the detection plane or in the reconstruction plane, is lower than or equal to 1. The quantity $\varepsilon^k(x,y)$ associated with each pixel, in step 130, is a modulus of a difference between the image $A_z^k$, in each pixel, and the value 1. Such a quantity may be obtained using the expression:

$$\varepsilon^k(x,y)=\sqrt{(A_z^k(x,y)-1)(A_z^k(x,y)-1)^*}=|A_z^k(x,y)-1| \quad (20)$$

and, in step 140, $\varepsilon^k=\Sigma_{(x,y)}\varepsilon^k(x,y)$ (21), this corresponding, in a non-discretized form, to $\varepsilon^k(A_z^k)=\int |A_z^k-1|=\int d\vec{r} \cdot \sqrt{(A_z^k(r)-1)(A_z^k(r)-1)^*}$ (22), r being a radial coordinate in the reconstruction plane.

The noise indicator is yet again a norm of order 1 of a vector $\varepsilon^k$ each term of which is the modulus $\varepsilon^k(x,y)$ calculated for each pixel.

It is possible to show that the gradient of this noise indicator $\varepsilon^k$, with respect to the phase vector, is such that:

$$s\nabla \varepsilon^k(r') = \frac{\partial \varepsilon^k}{\partial \varphi_0^k(r')} = \text{Im}(A_0^{k*})(r') \cdot \left(\frac{(A_z^k-1)}{|A_z^k-1|} * h_z\right)(r') \quad (23)$$

r' being a radial coordinate in the detection plane.

Just like the total variation norm described above with reference to expression (15), the use of such an indicator is suited to a sample containing particles 10b dispersed in a homogenous medium 10a. During the gradient descent algorithm, this indicator tends to decrease the number of pixels the modulus of which is not equal to 1 in zones that are distributed discretely in the image of the sample, these zones corresponding to the particles 10b of the sample.

According to another variant, in step 130, the norm is such that:

$$\varepsilon^k(x,y)=((A_z^k(x,y))(A_z^k(x,y))^*-1)=|A_z^k(x,y)|^2-1 \quad (25)$$

Then, in step 140, $\varepsilon^k=\frac{1}{2}\Sigma_{(x,y)}(\varepsilon^k(x,y))^2$ (26), which corresponds, in a non-discretized form, to $\varepsilon^k=\frac{1}{2}\int(|A_z^k|^2-1)^2$ (27)

Just as in the preceding embodiments, step 130 includes calculating a quantity $\varepsilon^k(x,y)$ associated with each pixel, based on a modulus of the complex image $A_z^k$, then calculating a noise indicator associated with the complex image $A_z^k$ based on a norm. According to this variant, it is a question of a norm of order 2.

It is possible to show that the gradient of this indicator, with respect to the phase vector, is such that:

$$\nabla \varepsilon^k(r') = \frac{\partial \varepsilon^k}{\partial \varphi_0^k(r')} = 2\,\mathrm{Im}A_0^{k*}\left(\left((|A_z^k|^2-1)A_z^k\right)*h_z(r')\right) \quad (28)$$

According to another variant, in step 130, the quantity associated with each pixel is such that $$\varepsilon^k(x,y)=\varepsilon^k(x,y)=((A_z^k(x,y))(A_z^k(x,y))^*-1)=|A_z^k(x,y)|^2-1 \quad (30)$$

Then, in step 140, $\varepsilon^k=\Sigma_{(x,y)}\varepsilon^k(x,y)$ (31), which corresponds, in a non-discretized form, to $\varepsilon^k=\frac{1}{2}\int\||A_z^k|^2-1|$ (32). The quantity associated with each pixel is identical to the preceding variant (see equation (25)), but the noise indicator associated with the image is calculated using a norm of order 1.

According to another variant, in step 130, the quantity associated with each pixel is such that $$\varepsilon^k(x,y)=\sqrt{(A_z^k(x,y))(A_z^k(x,y))^*}-1|=|A_z^k(x,y)|-1 \quad (35)$$

Then, in step 140, $\varepsilon^k=\Sigma_{(x,y)}\varepsilon^k(x,y)$ (36), which corresponds, in a non-non-discretized form, to $\varepsilon^k=\frac{1}{2}\int\||A_z^k|-1|$ (37)

Thus, whatever the embodiment, the noise indicator $\varepsilon^k$ associated with a complex image $A_z^k$, may be obtained by:
  calculating a quantity for a plurality of pixels of the image, based on a value of the latter, a modulus of the latter or a dimensional derivative of the latter; and
  combining said quantities in the form of a norm, and preferably of a norm of order lower than 1.

FIG. 4 summarizes the main steps of the algorithm described above: on the basis of an image $I_0$ acquired by the image sensor 16, an initial image $A_0^{k=0}$ is formed. In each iteration k, a complex image $A_z^k$, representing the light wave 22 in a reconstruction plane $P_z$, is established by numerical propagation of an image $A_0^k$ representing the light wave 22 in the detection plane $P_0$. A noise indicator $\varepsilon^k$ is associated with the image $A_z^k$. Its gradient $\nabla\varepsilon^k$, as a function of the phase $\varphi_0^k$ of the light wave 22, in the detection plane $P_0$, is calculated, on the basis of which said phase of the light wave 22 in the detection plane, is updated. This update allows a new complex image $A_0^{k+1}$ to be formed in the detection plane $P_0$, on the basis of which image a new iteration may be carried out. A notable aspect of the invention is that the phase $\varphi_0^k$ is updated in the detection plane $P_0$ using an optimisation algorithm based on the gradient of the indicator as a function of said phase.

In the embodiments described above, the indicator $\varepsilon^k$ describes an increasing function of reconstruction noise. In other words, the greater the reconstruction noise, the higher the indicator $\varepsilon^k$. The optimization algorithm therefore tends to minimize this indicator, in particular on the basis of its gradient $\nabla\varepsilon^k$. The invention may naturally be applied to an indicator describing a decreasing function of reconstruction noise, the indicator decreasing as the reconstruction noise increases. The optimization algorithm then intends to maximize the indicator, in particular on the basis of its gradient. Generally, it is preferable for the noise indicator to follow a monotonic function of the cumulative amplitude of the reconstruction noise in the complex image.

The invention has been implemented, using the total variation norm, on Chinese hamster ovary (CHO) cells submerged in a CD CHO (Thermo Fisher) culture medium. The sample was placed in a fluidic chamber of 100 μm thickness, put at a distance of 8 cm from a light-emitting diode, the spectral band of which was centered on 450 nm. The sample was placed at a distance of 1500 μm from a CMOS image sensor of 2748×3840 pixels. The aperture of the spectral filter 18 has a diameter of 150 μm.

FIG. 5A shows the image $I_0$ acquired by the image sensor 16. The images of the modulus and of the phase of the reference complex image $A_{ref}$ in the plane $P_{10}$ of the sample, are shown in FIGS. 5B and 5C, respectively. These images were obtained in 100 iterations. The uniformity of the greyscale levels between each cell attests to the quality of the reconstruction.

Another example is presented in FIGS. 6A to 6C. In these examples, the sample includes red blood cells diluted in an aqueous solution containing a PBS (phosphate-buffered saline) buffer diluted to 1/400. The sample 10 was placed in a fluidic chamber 15 of 100 μm thickness, put at a distance of 8 cm from the light-emitting diode described above, the spectral band of which was centered on 450 nm. The sample was placed at a distance of 1.5 mm from the CMOS image sensor described above. The aperture of the spatial filter 18 was equal to 150 μm.

FIG. 6A shows the image $I_0$ acquired by the image sensor. The images of the modulus and of the phase of the reconstructed complex image $A_z^{k=8}$, in the plane $P_{10}$ of the sample, are shown in FIGS. 6B and 6C, respectively. These images were obtained in 8 iterations.

Whatever the embodiment, it may be necessary to estimate a distance between the detection plane $P_0$ and the plane $P_{10}$ of the sample, in particular when the reference complex image is formed in the plane of the latter. This distance may be known geometrically, or may be estimated by implementing an autofocus algorithm, autofocus algorithms being commonplace in the field of holographic reconstruction.

The invention will possibly be applied to the observation of a sample by holographic reconstruction, the hologram being obtained either by lens-free imaging, or by defocused imaging. In this case, the hologram is an image acquired by an image sensor, in a plane different from the focal plane of an optical system coupled to the image sensor.

It will possibly be applied to the characterization of samples in the fields of biotechnology and of diagnostics, but also in the field of food processing, or of the analysis of samples taken from the environment or from industrial processes.

The invention claimed is:

1. A method for observing a sample comprising:
  a) illuminating the sample using a light source, configured to emit a light wave that propagates towards the sample;
  b) acquiring, using an image sensor, an image of the sample, the image being formed in a detection plane, the sample being placed between the light source and the image sensor, the acquired image being representative of a light wave transmitted by the sample under an effect of the illumination, the acquired image comprising interference patterns formed by interference between the light wave emitted by the light source and a light wave diffracted by the sample; and c) calculating a complex image representative of the sample;

wherein calculating the complex image representative of the sample comprises:

i) defining an initial image of the sample in the detection plane, on the basis of the image acquired by the image sensor;

ii) determining a complex image of the sample in a reconstruction plane by applying a propagation operator to an initial image of the sample, which is the image defined in i), or to the image of the sample, in the detection plane, resulting from the preceding iteration;

iii) calculating a noise indicator on the basis of the complex image obtained in ii), the noise indicator depending on a reconstruction noise affecting the complex image, the noise indicator being representative of fluctuations appearing in the complex image;

iv) updating the image of the sample in the detection plane by adjusting phase values of the pixels of the image, the adjustment being carried out depending on a variation in the noise indicator calculated in iii) with respect to the phase values;

v) reiterating ii) to iv) until a convergence criterion is reached, so as to obtain a complex image of the sample in the detection plane, or in the reconstruction plane.

2. The method of claim 1, wherein iii) comprises:

for various pixels, calculating a quantity associated with each pixel, depending on a value of the complex image determined in ii) for the pixel, or on a dimensional derivative of the complex image for the pixel; and combining the quantities calculated for different pixels, so as to obtain the noise indicator.

3. The method of claim 2, wherein the noise indicator is a norm of order lower than or equal to 1 calculated on the basis of the quantities respectively associated with each pixel.

4. The method of claim 3, wherein, in iii), the noise indicator is calculated on the basis of the value of the complex image in a plurality of pixels.

5. The method of claim 4, wherein:

in i), the initial image of the sample is defined by normalizing the image acquired by the image sensor by an image representative of the light wave emitted by the light source; and in iii), the quantity associated with each pixel is calculated depending on the value of the complex image determined in ii), for the pixel, subtracted from a strictly positive number.

6. The method of claim 2, wherein, in iii), the quantity associated with each pixel is calculated on the basis of a modulus of a dimensional derivative, for the pixel, of the complex image determined in ii).

7. The method of claim 2, wherein, in iii), the noise indicator is a sum, which is weighted, of the quantity associated with each pixel of the complex image in the reconstruction plane.

8. The method of claim 1, wherein, in iv), the value of the phase of each pixel is adjusted by forming a phase vector, each term of which corresponding to the value of the phase of a pixel of the image of the sample in the detection plane, the phase vector being updated, in each iteration, so as to minimise, or to maximise, the noise indicator calculated in iii), the update being based on a gradient of the noise indicator, with respect to each term of the phase vector.

9. The method of claim 8, wherein the phase vector is updated by a minimization or maximization algorithm based on a gradient of the noise indicator with respect to each term of the phase vector.

10. The method of claim 1, wherein the reconstruction plane lies parallel to the detection plane.

11. The method of claim 1, wherein the reconstruction plane is a plane in which the sample lies.

12. The method of claim 1, wherein no magnifying optic is interposed between the sample and the image sensor.

13. The method of claim 1, further comprising d) characterizing the sample depending on the calculated complex image.

14. A device for observing a sample, the device comprising:

a light source configured to emit an incident light wave that propagates towards the sample to illuminate the sample;

an image sensor configured to acquire an image of the sample, the image being formed in a detection plane, the acquired image being representative of a light wave transmitted by the sample under an effect of the illumination, the acquired image comprising interference patterns formed by interference between the light wave emitted by the light source and a light wave diffracted by the sample;

a holder configured to hold the sample between the light source and the image sensor; and a processor configured to receive the acquired image of the sample, and calculate a complex image representative of the sample by i) defining an initial image of the sample in the detection plane, on the basis of the image acquired by the image sensor, ii) determining a complex image of the sample in a reconstruction plane by applying a propagation operator to an initial image of the sample, which is the image defined in i), or to the image of the sample, in the detection plane, resulting from the preceding iteration, iii) calculating a noise indicator on the basis of the complex image obtained in ii), the noise indicator depending on a reconstruction noise affecting the complex image, the noise indicator being representative of fluctuations appearing in the complex image, iv) updating the image of the sample in the detection plane by adjusting phase values of the pixels of the image, the adjustment being carried out depending on a variation in the noise indicator calculated in iii) with respect to the phase values, and v) reiterating ii) to iv) until a convergence criterion is reached, so as to obtain a complex image of the sample in the detection plane, or in the reconstruction plane.

* * * * *